US010671913B2

(12) United States Patent
Liu et al.

(10) Patent No.: US 10,671,913 B2
(45) Date of Patent: Jun. 2, 2020

(54) COMPUTATION DEVICE AND METHOD

(71) Applicant: Shanghai Cambricon Information Technology Co., Ltd, Pudong New Area (CN)

(72) Inventors: Shaoli Liu, Pudong New Area (CN); Wei Li, Pudong New Area (CN); Tian Zhi, Pudong New Area (CN); Tianshi Chen, Pudong New Area (CN)

(73) Assignee: SHANGHAI CAMBRICON INFORMATION TECHNOLOGY CO., LTD, Pudong New Area (CN)

( * ) Notice: Subject to any disclaimer, the term of this patent is extended or adjusted under 35 U.S.C. 154(b) by 0 days.

(21) Appl. No.: 16/520,615

(22) Filed: Jul. 24, 2019

(65) Prior Publication Data

US 2019/0347544 A1    Nov. 14, 2019

Related U.S. Application Data

(63) Continuation of application No. 16/281,711, filed on Feb. 22, 2019, which is a continuation-in-part of (Continued)

(30) Foreign Application Priority Data

Apr. 19, 2017    (CN) .......................... 2017 1 0256444

(51) Int. Cl.
*G06F 15/76*    (2006.01)
*G06N 3/063*    (2006.01)
(Continued)

(52) U.S. Cl.
CPC ......... *G06N 3/063* (2013.01); *G06F 9/30025* (2013.01); *G06F 9/30083* (2013.01); *G06F 9/3802* (2013.01)

(58) Field of Classification Search
CPC ...................................................... G06F 15/00
See application file for complete search history.

(56) References Cited

U.S. PATENT DOCUMENTS

| 8,458,442 B2 * | 6/2013 | Eichenberger ...... G06F 9/30032 712/213 |
| 9,043,548 B2 * | 5/2015 | Grube ................. G06F 11/1666 711/114 |

(Continued)

FOREIGN PATENT DOCUMENTS

| CN | 102508803 A | 6/2012 |
| CN | 105426160 A | 3/2016 |

OTHER PUBLICATIONS

CN20110256444.5, Official Action dated Jan. 2, 2020, 11 pages.
EP19199521, European Search Report dated Feb. 10, 2020, 5 pages.
EP19199528, European Search Report dated Feb. 11, 2020, 6 pages.

*Primary Examiner* — Cheng Yuan Tseng
(74) *Attorney, Agent, or Firm* — Getech Law LLC; Jun Ye (57) ABSTRACT

The present disclosure provides a computation device and method, which are capable of using a single instruction to complete a transpose computation of a matrix of any size within constant time. Compared with conventional methods for performing a matrix transpose computation, the device and method may reduce the time complexity of a matrix transpose computation as well as making the usage of the computation simpler and more efficient.

12 Claims, 5 Drawing Sheets

Related U.S. Application Data application No. PCT/CN2018/081929, filed on Apr. 4, 2018.

(51) Int. Cl.
*G06F 9/38* (2018.01)
*G06F 9/30* (2018.01)

(56) References Cited

U.S. PATENT DOCUMENTS

| | | | |
|---|---|---|---|
| 9,787,990 B2 * | 10/2017 | Gokhale | H04N 19/159 |
| 10,169,296 B2 * | 1/2019 | Korthikanti | G06F 17/16 |
| 10,469,152 B2 * | 11/2019 | Peng | H04B 7/0456 |

* cited by examiner

ND METHOD

TECHNICAL FIELD

The present disclosure relates to the technical field of computing, and more particularly to a computation device and method.

BACKGROUND

Matrix transpose, a computation that processes a matrix by interchanging the rows and the columns, is a basic mathematical computation frequently used in many fields. Currently, a conventional method of using a computer to perform a matrix transpose is using a general-purpose processor to write a two-layer loop in which the time complexity is $O(n^2)$. A matrix transpose computation with such time complexity may be a bottleneck for the performance improvement of a complicated system, especially in the case of a matrix having a great number of elements.

SUMMARY (I) Technical Problem to be Solved

The present disclosure provides a computation device and method, which may at least partially solve the above-mentioned technical problem.

(II) Technical Solutions

According to an aspect of the present disclosure, a computation device is provided including:

a matrix computation control unit for determining partitioning information;

a computation unit for subjecting a computation matrix to a partitioning computation, a transpose computation, and a merging computation according to the partitioning information, to obtain a transposed matrix of the computation matrix.

In some embodiments, the computation device may further include:

an address storage unit for storing address information of the computation matrix; and a data storage unit for storing the computation matrix, and storing the transposed matrix after computations;

the matrix computation control unit may be configured to extract the address information of the computation matrix from the address storage unit, and analyze the address information of the computation matrix to obtain the partitioning information; the computation unit may be configured to acquire the address information and the partitioning information of the computation matrix from the matrix computation control unit, extract the computation matrix from the data storage unit according to the address information of the computation matrix, and subject the computation matrix to the partitioning computation, the transpose computation, and the merging computation according to the partitioning information to obtain the transposed matrix of the computation matrix, as well as to feedback the transposed matrix of the computation matrix to the data storage unit.

In some embodiments, the computation unit may include a matrix partitioning unit, a matrix computation unit, and a matrix merging unit, where the matrix partitioning unit may be configured to acquire the address information and the partitioning information of the computation matrix from the matrix computation control unit, extract the computation matrix from the data storage unit according to the address information of the computation matrix, and partition the computation matrix according to the partitioning information into n partitioned matrices;

the matrix computation unit may be configured to acquire the n partitioned matrices, and subject the n partitioned matrices to a transpose computation to obtain transposed matrices of the n partitioned matrices;

the matrix merging unit may be configured to acquire and merge the transposed matrices of the n partitioned matrices, to obtain a transposed matrix of the computation matrix, and return the transposed matrix of the computation matrix to the data storage unit, where n is a natural number.

In some embodiments, the computation unit may further include a buffer unit for buffering the n partitioned matrices so that the matrix computation unit can acquire the n partitioned matrices.

In some embodiments, the matrix computation control unit may include an instruction processing unit, an instruction buffer unit, and a matrix determination unit, where the instruction buffer unit may be configured to store matrix computational instructions to be executed;

the instruction processing unit may be configured to acquire matrix computational instructions from the instruction buffer unit, decode the matrix computational instructions, and acquire the address information of the computation matrix from the address storage unit according to the decoded matrix computational instructions;

the matrix determination unit may be configured to analyze the address information of the computation matrix to obtain the partitioning information.

In some embodiments, the matrix computation control unit may further include a dependency processing unit for determining whether the decoded matrix computational instructions and the address information of the computation matrix are conflict with a previous computation, if a conflict exists, the decoded matrix computational instructions and the address information of the computation matrix may be temporarily stored; if no conflict exists, the decoded matrix computational instructions and the address information of the computation matrix may be sent to the matrix determination unit.

In some embodiments, the matrix computation control unit may further include an instruction queue memory for buffering the decoded matrix computational instructions and the address information of computation matrix with conflict; when the conflict is eliminated, the decoded matrix computational instructions and the address information of computation matrix that are buffered may be sent to the matrix determination unit.

In some embodiments, the instruction processing unit may include a fetching unit and a decoding unit, where the fetching unit may be configured to acquire the matrix computational instructions from the instruction buffer unit and transmit the matrix computational instructions to the decoding unit;

the decoding unit may be configured to decode the matrix computational instructions, extract the address information of the computation matrix from the address storage unit according to the decoded matrix computational instructions, and transmit the decoded matrix computational instructions and the extracted address information of the computation matrix to the dependency processing unit.

In some embodiments, the device may further include an input/output unit for inputting the computation matrix data to the data storage unit and acquiring the transposed matrix after computation from the data storage unit, and outputting the transposed matrix after computation.

In some embodiments, the address storage unit may include a scalar register file or a universal memory unit; the data storage unit may include a cache or a universal memory unit; the address information of the computation matrix may be initial address information of the matrix and matrix size information.

Another aspect of the present disclosure provides a computation method including:

determining partitioning information by a matrix computation control unit;

subjecting, by a computation unit, a computation matrix to a partitioning computation, a transpose computation, and a merging computation according to the partitioning information, to obtain a transposed matrix of the computation matrix.

In some embodiments, the determining partitioning information by the matrix computation control unit may include:

extracting address information of the computation matrix by the matrix computation control unit from an address storage unit; and obtaining the partitioning information according to the address information of the computation matrix by the matrix computation control unit.

In some embodiments, the extracting address information of the computation matrix by the matrix computation control unit from an address storage unit may include:

extracting computational instructions by a fetching unit and sending the computational instructions to a decoding unit;

decoding, by the decoding unit, the computational instructions, acquiring the address information of the computation matrix from the address storage unit according to the decoded computational instructions, and sending the decoded computational instructions and the address information of the computation matrix to a dependency processing unit;

analyzing, by the dependency processing unit, whether the decoded computational instructions have a dependency in term of data with previous instructions that have not been completed; if a dependency exists, the decoded computational instructions and the corresponding address information of the computation matrix may need to wait in an instruction queue memory until their dependency in term of data with the previous instructions that have not been completed no longer exists.

In some embodiments, the subjecting by the computation unit the computation matrix to the partitioning computation, the transpose computation, and the merging computation according to the partitioning information to obtain the transposed matrix of the computation matrix may include:

extracting, by the computation unit, the computation matrix from the data storage unit according to the address information of the computation matrix, and partitioning the computation matrix into n partitioned matrices according to the partitioning information;

performing, by the computation unit, the transpose computations on the n partitioned matrices respectively to obtain transposed matrices for the n partitioned matrices; and merging, by the computation unit, the transposed matrices for the n partitioned matrices to obtain a transposed matrix of the computation matrix and feedback the transposed matrix of the computation matrix to the data storage unit;

where n is a natural number.

In some embodiments, the merging by the computation unit the transposed matrices for the n partitioned matrices to obtain the transposed matrix of the computation matrix and feedback the transposed matrix of the computation matrix to the data storage unit may include:

receiving, by a matrix merging unit, the transposed matrix of each partitioned matrix, performing a matrix merging operation on all the partitions when a count of the received transposed matrices for the partitioned matrices reaches a total count, to obtain the transposed matrix of the computation matrix; and feeding back the transposed matrix to a designated address of the data storage unit;

accessing, by an input/output unit, the data storage unit directly, and reading the transposed matrix of the computation matrix obtained by computation from the data storage unit.

(III) Technical Effect

It can be learnt from the above technical solutions that the computation device and method according to the present disclosure may have the following technical effect:

the computation device and method of the present disclosure can partition a computation matrix, transpose a plurality of partitioned matrices respectively to obtain transposed matrices of the plurality of partitioned matrices, and lastly merge the transposed matrices of the plurality of partitioned matrices to obtain a transposed matrix of the computation matrix. By doing so, it is possible to finish a transpose computation of a matrix of any size within constant time complexity by a single instruction. Compared with conventional methods for performing a matrix transpose computation, the device and method may reduce the time complexity of a matrix transpose computation as well as making the usage of the computation more simple and efficient.

BRIEF DESCRIPTION OF THE DRAWINGS

The drawings are intended to facilitate further understanding of the present disclosure and constitute a part of the specification, and, together with the embodiments below, serve to explain the present disclosure, rather than limit the present disclosure. In the drawings.

DETAILED DESCRIPTION

To facilitate the understanding of the object, technical solutions, and advantages of the present disclosure, the present disclosure will be further described in detail below with reference to the specific embodiments and drawings.

It should be noted that in the drawings or the description of the specification, the similar reference numbers are used for similar or identical parts. Implementing modes not shown or described in the drawings are known to those of ordinary skill in the art. Additionally, although examples including parameters of specific values may be provided herein, it should be understood that the parameters are not necessarily exactly equal to the corresponding values, but may approximate the corresponding values within acceptable tolerances or design constraints. The directional terms mentioned in the embodiments, such as "upper", "lower", "front", "back", "left", "right", etc., only refer to the directions in the drawings. Therefore, the directional terms here are used to describe, rather than limit, the scope of protection of the present disclosure.

An embodiment of the present disclosure provides a computation device including:

a matrix computation control unit 3-2 for determining partitioning information; and a computation unit 3-3 for subjecting a computation matrix to a partitioning computation, a transpose computation, and a merging computation according to the partitioning information, to obtain a transposed matrix of the computation matrix.

To be specific, the partitioning information may contain at least one of a partition size information, a partition mode information, or a partition merging information. The partition size information indicates size information of each obtained partitioned matrix after the computation matrix is partitioned. The partition mode information indicates a mode of partitioning on the computation matrix. The partitioning merging information indicates a method of merging to obtain a transposed matrix of the computation matrix after the transpose computations on the partitioned matrices.

The computation device according to the present disclosure can partition the computation matrix, obtain transposed matrices of a plurality of the partitioned matrices by performing transpose computations respectively on the plurality of partitioned matrices, and finally merge the transposed matrices of the plurality of the partitioned matrices to obtain a transposed matrix of the computation matrix, so that it is possible to finish a transpose operation of a matrix of any size within constant time complexity by a single instruction. Compared with conventional methods of matrix transpose operation, the present disclosure may make the use of the matrix transpose operation simpler and more efficient while reducing the operation time complexity.

Figure 1:
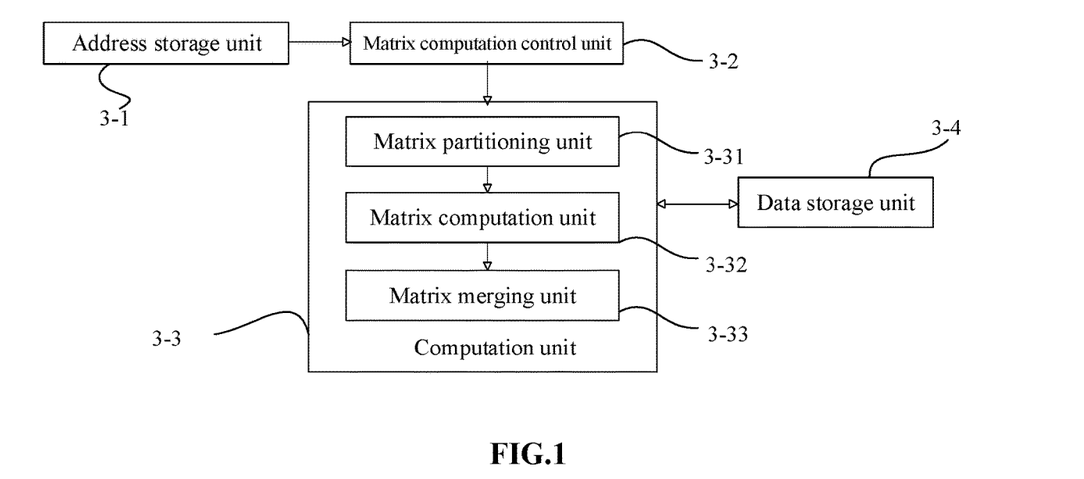
FIG. 1 is a structural diagram for a computation device according to the present disclosure.
Figure 2:
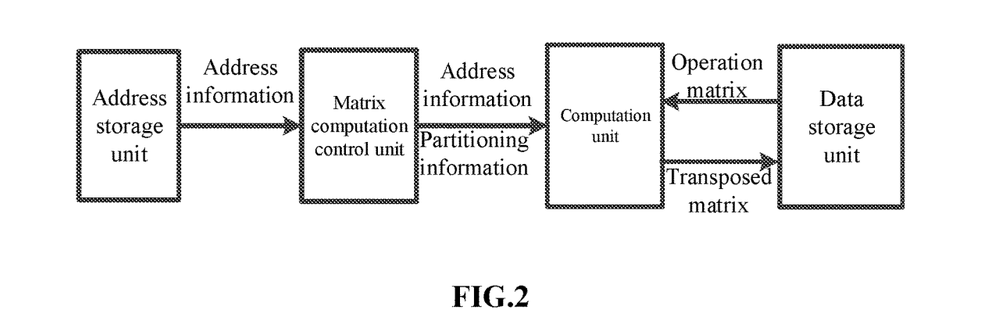
FIG. 2 is a diagram for information flow of a computation device according to the present disclosure.

As shown in FIGS. 1 and 2, in some embodiments of the present disclosure, the computation device may further include:

an address storage unit 3-1 for storing address information of the computation matrix; and a data storage unit 3-4 for storing initial matrix data including the computation matrix, and storing the transposed matrix after computations;

the matrix computation control unit may be configured to extract the address information of the computation matrix from the address storage unit, and analyze the address information of the computation matrix to obtain the partitioning information; the computation unit may be configured to acquire the address information and the partitioning information of the computation matrix from the matrix computation control unit, extract the computation matrix from the data storage unit according to the address information of the computation matrix, and subject the computation matrix to the partitioning computation, the transpose computation, and the merging computation according to the partitioning information to obtain the transposed matrix of the computation matrix, as well as to feedback the transposed matrix of the computation matrix to the data storage unit.

Figure 3:
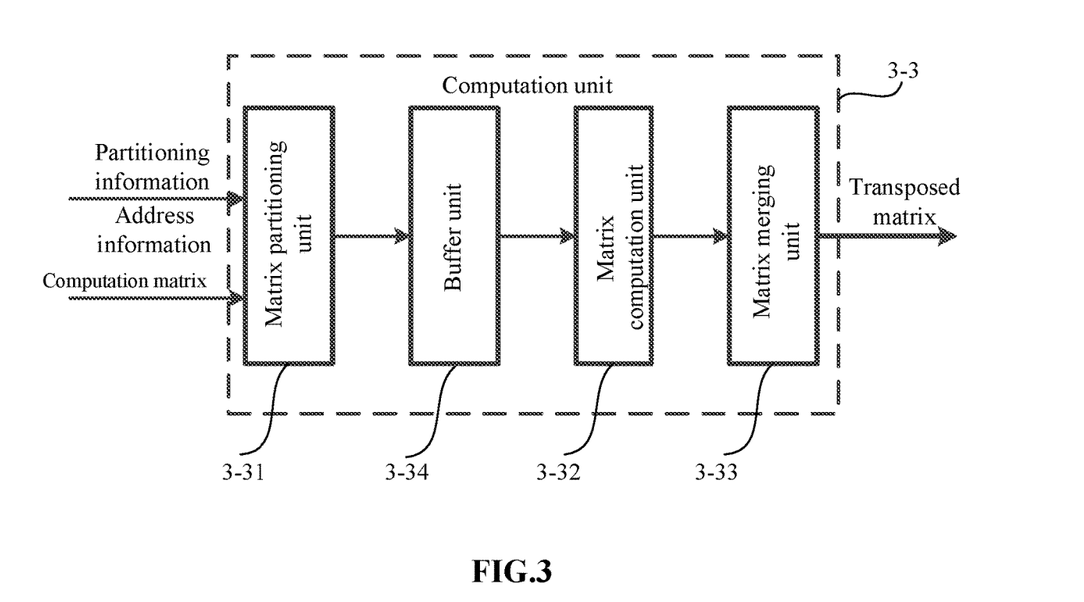
FIG. 3 is a structural diagram for a computation unit in a computation device according to the present disclosure.

As shown in FIG. 3, in some embodiments of the present disclosure, the above-mentioned computation unit may include a matrix partitioning unit, a matrix computation unit, and a matrix merging unit, where the matrix partitioning unit 3-31 may be configured to acquire the address information and the partitioning information of the computation matrix from the matrix computation control unit, extract the computation matrix from the data storage unit according to the address information of the computation matrix, and partition the computation matrix according to the partitioning information into n partitioned matrices;

the matrix computation unit 3-32 may be configured to acquire the n partitioned matrices, and subjecting the n partitioned matrices to a transpose computation to obtain transposed matrices for the n partitioned matrices;

the matrix merge unit 3-33 may be configured to acquire and merge the transposed matrices of the n partitioned matrices to obtain transposed matrices of the computation matrices, where n is a natural number.

Figure 4:
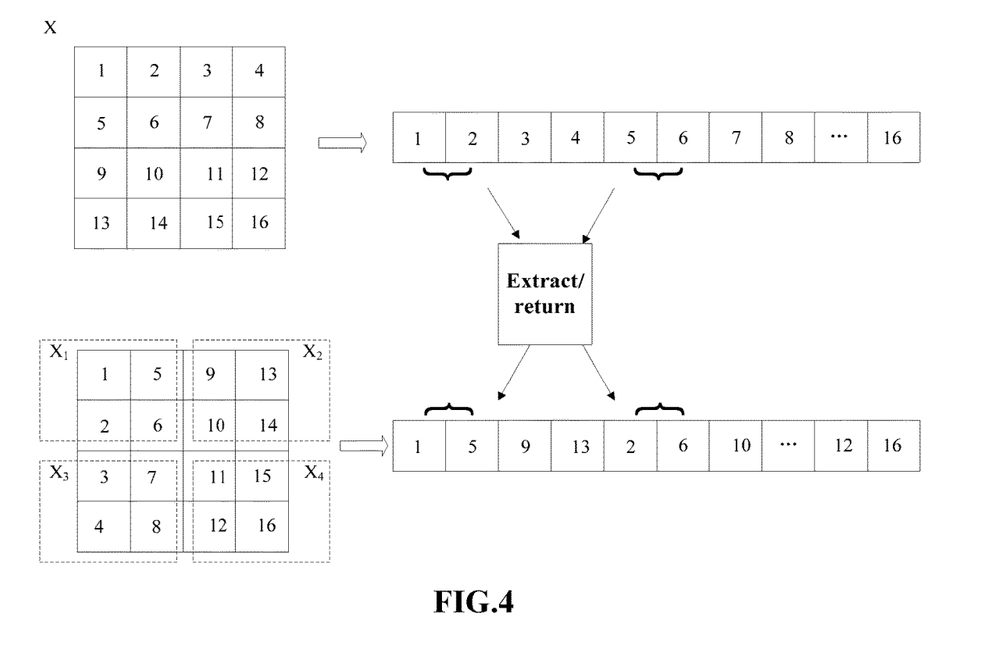
FIG. 4 is a diagram for a matrix computation by a computation unit according to the present disclosure.

For example, as shown in FIG. 4, for a computation matrix X stored in the data storage unit, the matrix partitioning unit of the computation unit may extract the computation matrix X from the data storage unit, and perform the partitioning computation operation on the computation matrix X according to the partitioning information to obtain four partitioned matrices $X_1$, $X_2$, $X_3$ and $X_4$, and output them to the matrix computation unit; the matrix computation unit may obtain these four partitioned matrices from the matrix partitioning unit, perform transpose computation operations on the four partitioned matrices respectively to obtain the transposed matrices $X_1^T$, $X_2^T$, $X_3^T$ and $X_4^T$ of the four partitioned matrices, and output the transposed matrices to the matrix merging unit; the matrix merging unit may obtain the transposed matrices of the four partitioned matrices from the matrix computation unit and merge them to the transposed matrix $X^T$ of the computation matrix; and the transposed matrix $X^T$ may further be output to the data storage unit.

In some embodiments of the present disclosure, the computation unit above may further include a buffer unit 3-34 for buffering the n partitioned matrices to be acquired by the matrix computation unit.

In some embodiments of the present disclosure, the matrix merge unit above may further include a memory for temporarily storing the transposed matrices of the acquired partitioned matrices; after the matrix computation unit finishes the computations for all partitioned matrices, the matrix merging unit can acquire the transposed matrices of all the partitioning matrices, and then perform a merging operation on the transposed matrices of n partitioned matrices to obtain the transposed matrix and write the output results back to the data storage unit.

It should be understood by those skilled in the art that the above-mentioned matrix partitioning unit, the matrix computation unit, and the matrix merging unit may be implemented in the forms of both hardware and software program units. The matrix partitioning unit and the matrix merging unit may include one or more control elements, and the matrix computation unit may include one or more control elements and computing elements.

Figure 5:
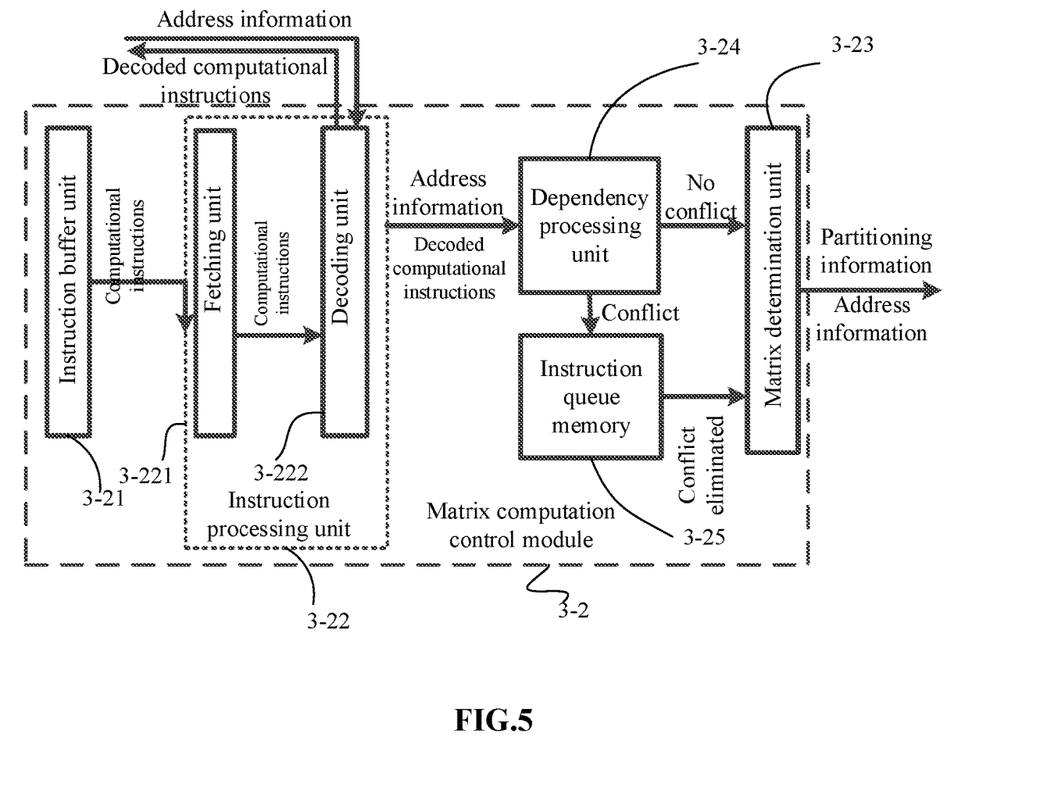
FIG. 5 is a structural diagram for a matrix computation control unit in a computation device according to the present disclosure.

As shown in FIG. 5, in some embodiments of the present disclosure, the above-mentioned matrix computation control unit may include an instruction processing unit 3-22, an instruction buffer unit 3-21, and a matrix determination unit 3-23, where the instruction buffer unit may be configured to store matrix computational instructions to be executed;

the instruction processing unit may be configured to acquire matrix computational instructions from the instruction buffer unit, decode the matrix computational instructions, and extract the address information of the computation matrix from the address storage unit according to the decoded matrix computational instructions;

the matrix determination unit may be configured to determine whether or not to perform the partitioning according to the address information of the computation matrix, and obtain the partitioning information according to a determination result.

In some embodiments of the present disclosure, the above-mentioned matrix computation control unit may further include a dependency processing unit 3-24 for determining whether the decoded matrix computational instructions and the address information of the computation matrix are conflict with a previous computation, if a conflict exists, the decoded matrix computational instructions and the address information of the computation matrix may be temporarily stored; if no conflict exists, the decoded matrix computational instructions and the address information of the computation matrix may be sent to the matrix determination unit.

In some embodiments of the present disclosure, the above-mentioned matrix computation control unit may further include an instruction queue memory 3-25 for buffering the decoded matrix computational instructions and the address information of computation matrix with conflict; when the conflict is eliminated, the decoded matrix computational instructions and the address information of computation matrix that are buffered may be sent to the matrix determination unit.

To be specific, when matrix computational instructions accesses the data storage unit, the previous and following instructions may access the same storage space; to ensure the correctness of the instruction execution result, if the present instruction is detected to be dependent on data of the previous instructions, the present instruction may have to wait in the instruction queue memory until the dependency is eliminated.

In some embodiments of the present disclosure, the above-mentioned instruction processing unit may include a fetching unit 3-221 and a decoding unit 3-222, where the fetch unit may be configured to acquire the matrix computational instructions from the instruction buffer unit and transmit the matrix computational instructions to the decoding unit;

the decoding unit may be configured to decode the matrix computational instructions, extract the address information of the computation matrix from the address storage unit according to the decoded matrix computational instructions, and transmit the decoded matrix computational instructions and the extracted address information of the computation matrix to the dependency processing unit.

In some embodiments of the present disclosure, the computation device above may further include an input/output unit for inputting the computation matrix data to the data storage unit and acquiring the transposed matrix after computation from the data storage unit, and outputting the transposed matrix after computation.

In some embodiments of the present disclosure, the above-mentioned address information of the computation matrix may include initial address information of matrix and matrix size information.

In some embodiments of the present disclosure, the address information of the computation matrix may be the storage address of matrix in the data storage unit.

In some embodiments of the present disclosure, the address storage unit may be a scalar register file or a universal memory unit; the data storage unit may be a cache or a universal memory unit.

In some embodiments of the present disclosure, the address storage unit may be a scalar register file, which provides a scalar register required in the process of computation; the scalar register may not only store the matrix addresses, but also store scalar data. The scalar data in the scalar register may be configured to record a count of matrix partitions after the partitioning operation when transposing a large scale matrix.

In some embodiments of the present disclosure, the data storage unit may be a cache, which can support matrix data of different sizes.

In some embodiments of the present disclosure, the matrix determination unit may be configured to determine the size of a matrix. If the size exceeds a prescribed maximum scale M, the matrix may be required to be subjected to a partitioning operation, and the matrix determination unit may make an analysis according to such determination result to obtain the partitioning information.

In some embodiments of the present disclosure, the instruction buffer unit may be configured to store matrix computational instructions to be executed. During the execution of the instructions, the instructions may be buffered in the instruction buffer unit at the same time. After one instruction is executed, if the instruction is also an earliest instruction among uncommitted instructions in the instruction buffer unit, the instruction may be committed. Once committed, a change in the state of the device caused by the operation of the instruction may not be revoked. The instruction buffer unit may be a re-ordering buffer.

In some embodiments of the present disclosure, the matrix computational instructions may be matrix transpose computational instructions including opcodes and operands, where the opcodes may be configured to indicate the function of the matrix transpose computational instructions, and the matrix computation control unit may determine to perform a matrix transpose by identifying the opcodes; the operands may be configured to indicate the data information of the matrix transpose operation instructions, where the data information may be an immediate operand or a register number; for example, when a matrix is to be acquired, the matrix initial address and matrix size may be acquired from a corresponding register according to the register number, and then the matrix stored in the corresponding address may be obtained from the data storage unit according to the matrix initial address and the matrix size.

The present disclosure uses a new computation structure to implement the transposition on a matrix simply and efficiently, which may reduce the time complexity of this computation.

The present disclosure further provides a computation method including:

Step 1: extracting, by a matrix computation control unit, address information of a computation matrix from an address storage unit;

Step 2: obtaining, by the matrix computation control unit, partitioning information according to the address information of a computation matrix, and transmitting the address information of the computation matrix and partitioning information to a computation unit;

Step 3: extracting, by the computation unit, the computation matrix from a data storage unit according to the address information of the computation matrix, and partitioning the computation matrix into n partitioned matrices according to the partitioning information;

Step 4: performing, by the computation unit, transpose computations on the n partitioned matrices respectively to obtain transposed matrices for the n partitioning matrices;

Step 5: merging, by the computation unit, the transposed matrices for the n partitioned matrices to obtain a transposed matrix of the computation matrix and feedback the transposed matrix to the data storage unit;

where n is a natural number.

The computation device and method provided in the present disclosure are described in detail by the following specific embodiments.

Figure 6:
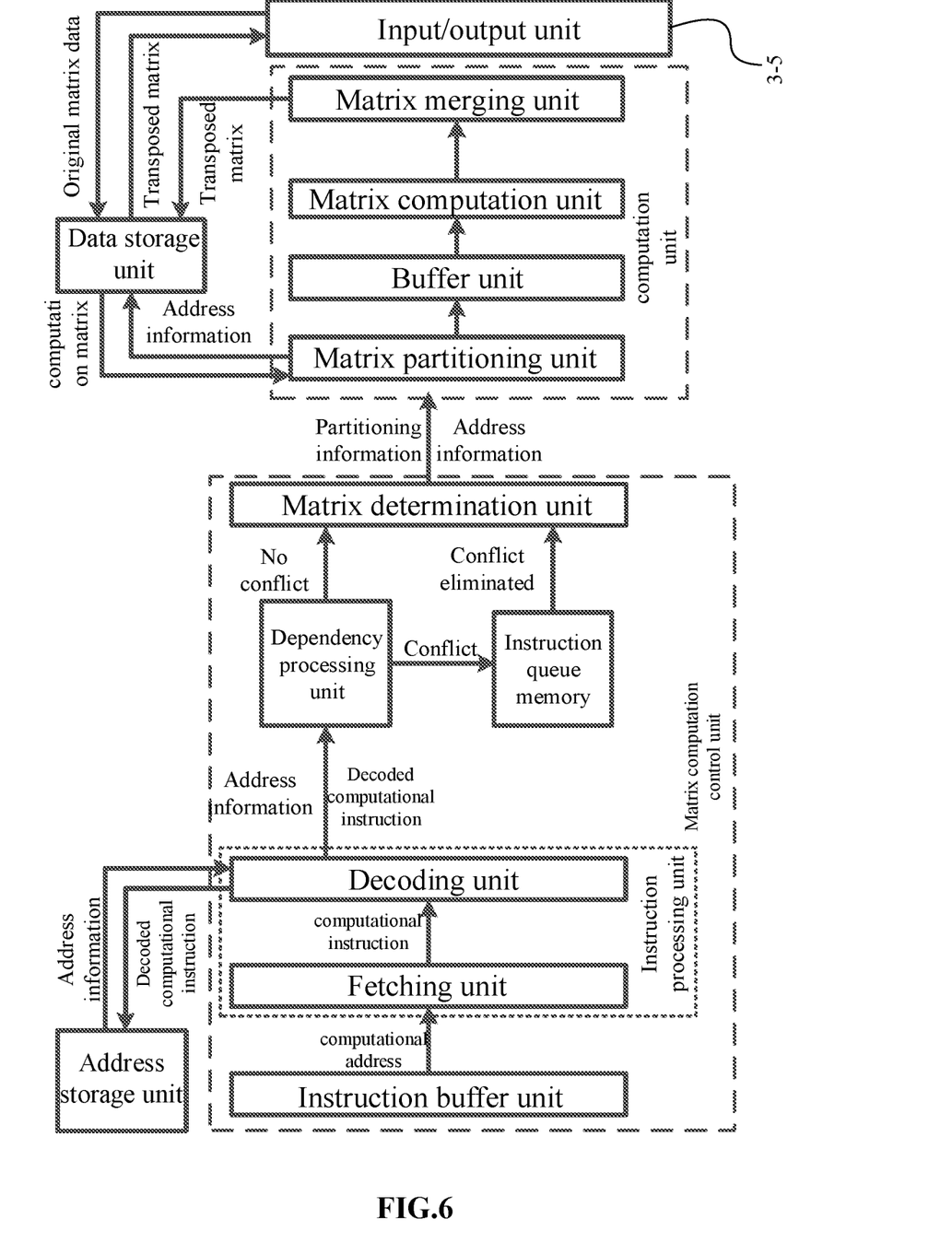
FIG. 6 is a specific structural diagram for a computation device according to one embodiment of the present disclosure.

In some embodiments, as shown in FIG. 6, a computation device is provided including an address storage unit, a matrix computation control unit, a computation unit, a data storage unit, and an input/output unit 3-5, where optionally, the matrix computation control unit may include an instruction buffer unit, an instruction processing unit, a dependency processing unit, an instruction queue memory, and a matrix determination unit, where the instruction processing unit may include a fetching unit and a decoding unit;

optionally, the computation unit may include a matrix partitioning unit, a matrix buffer unit, a matrix computation unit, and a matrix merging unit;

optionally, the address storage unit may be a scalar register file;

optionally, the data storage unit may be a cache; and the input/output unit may be an IO direct memory access unit.

The following is a detailed explanation on each component of the computation device:

The fetching unit may be configured to acquire a next computational instruction to be executed from the instruction buffer unit, and send this computational instruction to the decoding unit;

The decoding unit may be configured to decode the computational instruction, send the decoded computational instruction to the scalar register file, obtain address information of the computation matrix fed back by the scalar register file, and transmit the decoded computational instruction and the obtained address information of the computation matrix to the dependency processing unit;

The dependency processing unit may process a storage dependency possibly existing between a computational instruction and a previous computational instruction. The matrix computational instruction may access a cache, and previous and following instructions may access a same storage space. To ensure the correctness of an instruction execution result, if a present instruction is detected to be dependent on data of previous instructions, the present instruction may have to be buffered in the instruction queue memory and wait until the dependency is eliminated; if the present computational instruction is not dependent on any previous computational instruction, the dependency processing unit may directly transmit the address information of the computation matrix and the decoded computational instructions to a matrix determination unit;

considering that dependencies may exist on corresponding/assigned scalar registers for different computational instructions, the instruction queue memory may be configured to buffer the decoded computational instructions with conflict and the corresponding address information of the computation matrix; when the dependency is satisfied, the decoded computational instructions and the corresponding address information of the computation matrix may be sent to the matrix determination unit;

the matrix determination unit may be configured to determine the size of a matrix according to the address information of the computation matrix; if the size exceeds the prescribed maximum scale M, the matrix may be required to be subjected to a partitioning operation, and the matrix determination unit may make an analysis according to such determination result to obtain the partitioning information, and transmit the address information of the computation matrix and the obtained partitioning information to the matrix partitioning unit;

the matrix partitioning unit may be configured to extract the computation matrix to be transposed from the cache according to the address information of the computation matrix, and partition the computation matrix according to the partitioning information into n partitioned matrices.

the matrix buffer unit may be configured to buffer the n partitioned matrices and transmit them sequentially to the matrix computation unit for transpose computation;

the matrix computation unit may be configured to extract the partitioned matrices sequentially from the matrix buffer unit for transpose computation, and transmit the transposed partitioned matrices to the matrix merging unit;

the matrix merging unit may be configured to receive and temporarily store the transposed partitioned matrices, and perform a merging computation on the transposed matrices for the n partitioned matrices after all the partitioned matrices have been subjected to the transpose computation, to obtain a transposed matrix of the computation matrix.

The scalar register file may provide a scalar register required by the device in the process of computation and provide the address information of the computation matrix for computation;

the cache may be a transient storage device dedicated to matrix data and can support matrix data of different sizes;

the IO direct memory access unit may be configured to directly access the cache, and read data from or write data to the cache.

Figure 7:
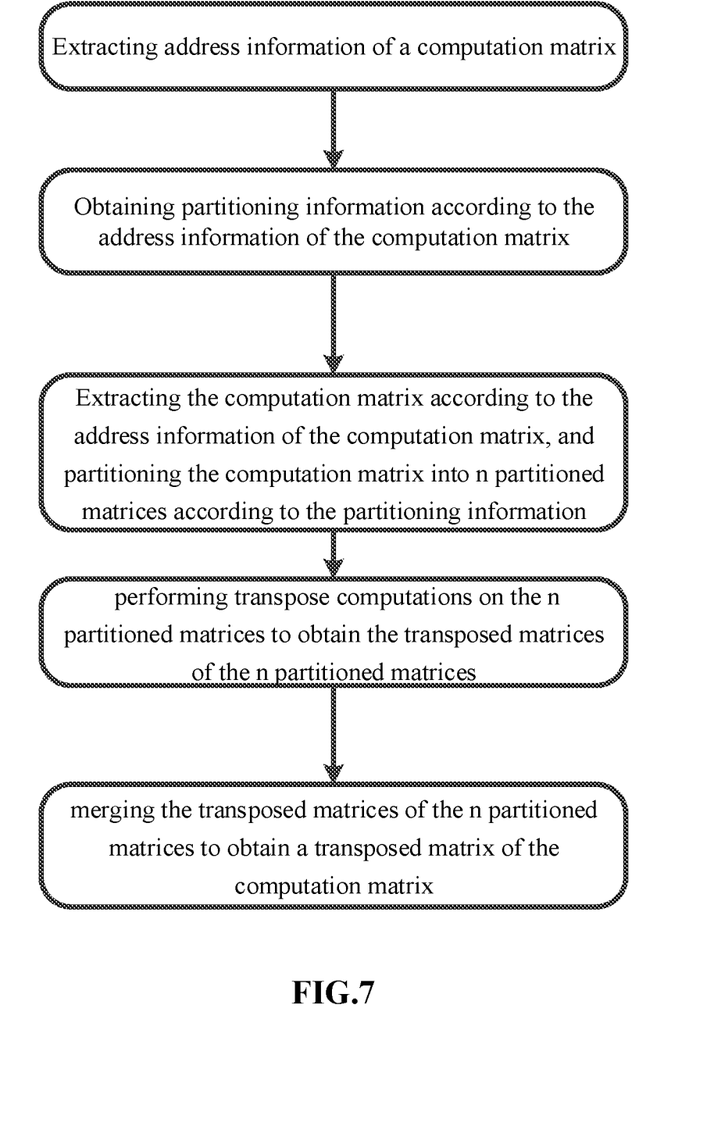
FIG. 7 is a flow chart of a computation method according to another embodiment of the present disclosure.

In some embodiments, as shown in FIG. 7, the present embodiment provides a computation method for executing a transpose computation on large-scale matrices including:

Step 1: extracting, by a matrix computation control unit, address information of a computation matrix from an address storage unit including:

Step 1-1: extracting computational instructions by a fetching unit and sending the computational instructions to a decoding unit;

Step 1-2: decoding, by the decoding unit, the computational instructions, acquiring the address information of the computation matrix from the address storage unit according to the decoded computational instructions, and sending the decoded computational instructions and the address information of the computation matrix to a dependency processing unit;

Step 1-3: analyzing, by the dependency processing unit, whether the decoded computational instructions have a dependency in term of data with previous instructions that have not been completed. Specifically, the dependency processing unit can determine whether there is a register to be written in according to the address of the register required to be read by the computational instruction; if the register is to be written in, a dependency may exist and the computational instruction cannot be executed until the data is written back;

if a dependency exists, this decoded computational instruction and the corresponding address information of the computation matrix may be required to wait in an instruction queue memory until the dependency in term of data with the previous instructions that have not been executed does not exist anymore;

Step 2: obtaining, by the matrix computation control unit, partitioning information according to the address information of the computation matrix;

specifically, after the dependency disappears, the instruction queue memory may send the decoded computational instruction and the corresponding address information of the computation matrix to the matrix determination unit to determine whether the matrix needs to be partitioned; the matrix determination unit may obtain partitioning information according to the determination result and transmit the partitioning information and the address information of the computation matrix to the matrix partitioning unit;

Step 3: extracting, by the computation unit, the computation matrix from the data storage unit according to the address information of the computation matrix, and partitioning the computation matrix into n partitioned matrices according to the partitioning information;

to be specific, the matrix partitioning unit may extract a required computation matrix from the data storage unit according to the introduced address information of the computation matrix, partition the computation matrix into n partitioned matrices according to the received partitioning information, and transmit each partitioned matrix to the matrix buffer unit sequentially upon completion of partitioning;

Step 4: performing, by the computation unit, transpose computations on the n partitioned matrices respectively to obtain transposed matrices of the n partitioned matrices;

to be specific, the matrix computation unit may sequentially extract the partitioned matrices from the matrix buffer unit, and transpose each of the extracted partitioned matrices, and then transmit the resulting transposed matrix for each partitioned matrix to the matrix merging unit.

Step 5: merging, by the computation unit, the transposed matrices of the n partitioned matrices to obtain a transposed matrix of the computation matrix, and feeding back the transposed matrix to the data storage unit including:

Step 5-1: the matrix merging unit may receive the transposed matrix of each partitioned matrix, and when a count of the received transposed matrices of the partitioned matrices reaches a total count of the partitions, a matrix merging operation may be applied on all the partitions to obtain the transposed matrix of the computation matrix, and feedback the transposed matrix to a specified address of the data storage unit;

Step 5-2: an input/output unit may directly access the data storage unit, and read the transposed matrix of the computation matrix obtained by computation from the data storage unit.

The vector mentioned in the present disclosure may be a 0-dimensional vector, a 1-dimensional vector, a 2-dimensional vector, or a multi-dimensional vector, where the 0-dimensional vector may also be called a scalar, and the 2-dimensional vector may also be called a matrix.

Heretofore, the embodiments of the present disclosure have been described in detail in conjunction with the drawings. Based on the above description, those skilled in the art should have a clear understanding of the computation device and method of the present disclosure.

In some embodiments, the present disclosure provides a chip including the above computation device.

In some embodiments, the present disclosure further provides a chip package structure including the above chip.

In some embodiments, the present disclosure further provides a board including the above chip package structure.

In some embodiments, the present disclosure further provides an electronic device including the above board.

The electronic device may include a data processing device, a robot, a computer, a printer, a scanner, a tablet, a smart terminal, a mobile phone, a driving recorder, a navigator, a sensor, a camera, a server, a cloud server, a camera, a video camera, a projector, a watch, an earphone, a mobile storage, a wearable device, a transportation, a household appliance, and/or a medical facility.

The transportation includes an airplane, a ship and/or a vehicle. The household appliance includes a television set, an air conditioner, a microwave oven, a refrigerator, a rice cooker, a humidifier, a washing machine, an electric lamp, a gas stove, and a range hood. The medical device includes a nuclear magnetic resonance instrument, a B-ultrasound machine, and/or an electrocardiograph.

It should be noted that, for the sake of brevity, the foregoing method embodiments are all described as a combination of a series of actions, but those skilled in the art should understand that the present disclosure is not limited by the described sequence of actions, because certain steps may be performed in other sequences or concurrently in accordance with the present disclosure. Furthermore, those skilled in the art should also understand that the embodiments described in the specification are all optional embodiments, and the actions and units involved are not necessarily required by the present disclosure.

The above various embodiments are described with different focuses, and the parts that are not detailed in a certain embodiment can be found in the related descriptions of other embodiments.

In the several embodiments provided herein, it should be understood that the disclosed device may be implemented in other ways. For example, the device embodiments described above are merely illustrative. For example, the division of the units is only a logical functional division. In actual implementations, there may be other dividing manners, for example, combining multiple units or components or integrating them into another system, or ignoring or not executing some features. In addition, the mutual coupling or direct coupling or communication connection shown or discussed may be indirect coupling or communication connection through some interfaces, devices or units, and may be in an electrical form or other forms.

The units described as separate components may or may not be physically separated, and the components presented as units may or may not be physical units; that is, they may be located in one place, or may be distributed to multiple network units. Some or all of the units may be selected according to actual needs to achieve the purpose of the technical solution of the embodiment.

In addition, the respective functional units in the respective embodiments of the present disclosure may be integrated into one processing unit, or each unit may exist in a physically independent manner, or two or more units may be integrated in one unit. The above integrated unit can be implemented in the form of hardware or in the form of a software program unit.

The integrated unit, if implemented in the form of a functional software unit and sold or used as a standalone product, may be stored in a computer readable memory.

Based on such understanding, the essence of the technical solution of the present disclosure or the part of the technical solution which makes a contribution to the prior art or the whole or part of the technical solution may be embodied in the form of a software product. The computer software product is stored in a memory which includes a number of instructions for causing a computer device (which may be a personal computer, server or network device, etc.) to perform all or some of the steps of the method described in each embodiment of the present disclosure. The foregoing memory includes various media that can store program codes, such as USB stick, Read-Only Memory (ROM), Random Access Memory (RAM), removable hard disk, magnetic disk, CD, and the likes.

Those skilled in the art may understand that all or some of the steps in the methods of the above embodiments can be completed with related hardware instructed by a program. The program can be stored in a computer readable memory. The memory may include: flash disk, Read-Only Memory (ROM), Random Access Memory (RAM), magnetic disk, CD, and the likes.

The above description of the disclosed embodiments enables those skilled in the art to implement or use the present disclosure. Various modifications to these embodiments are obvious to those skilled in the art, and the general principles defined herein may be implemented in other embodiments without departing from the spirit or scope of the present disclosure. Therefore, the present disclosure is not limited to the embodiments shown herein, but satisfies the broadest scope consistent with the principles and novel features disclosed herein.

It should be noted that the implementations that are not shown or described in the drawings or the description are all known to those skilled in the art, and are not described in detail. In addition, the above definitions of the various elements and methods are not limited to the specific structures, shapes or manners mentioned in the embodiments, and modifications and alternation can be readily conceived by those skilled in the art.

The foregoing embodiments further explain the objective, the technical solution, and the advantageous effects of the present disclosure. It is appreciated that the foregoing is merely specific embodiments of the present disclosure, and is not intended to be limiting. Any modification, equivalent substitution, improvements, etc. made within the spirit and principles of the present disclosure shall be included in the scope of the present disclosure.

What is claimed is:

1. A computation device, comprising:
a matrix computation control unit configured to determine partitioning information;
a computation unit configured to subject a computation matrix to a partitioning computation, a transpose computation, and a merging computation according to the partitioning information, to obtain a transposed matrix of the computation matrix;
an address storage unit configured to store address information of the computation matrix, and
a data storage unit configured to store the computation matrix and the transposed matrix after computations,
wherein the matrix computation control unit is configured to extract the address information of the computation matrix from the address storage unit, and analyze the address information of the computation matrix to obtain the partitioning information, and
wherein the computation unit is configured to acquire the address information and the partitioning information of the computation matrix from the matrix computation control unit, extract the computation matrix from the data storage unit according to the address information of the computation matrix, and subject the computation matrix to the partitioning computation, the transpose computation, and the merging computation according to the partitioning information to obtain the transposed matrix of the computation matrix, as well as to feedback the transposed matrix of the computation matrix to the data storage unit.

2. The computation device of claim 1,
wherein the computation unit includes a matrix partitioning unit, a matrix computation unit, and a matrix merging unit,
wherein the matrix partitioning unit is configured to acquire the address information and the partitioning information of the computation matrix from the matrix computation control unit, extract the computation matrix from the data storage unit according to the address information of the computation matrix, and partition the computation matrix according to the partitioning information into n partitioned matrices,
wherein the matrix computation unit is configured to acquire the n partitioned matrices, and subject the n partitioned matrices to a transpose computation to obtain transposed matrices of the n partitioned matrices, and
wherein the matrix merging unit is configured to acquire and merge the transposed matrices of the n partitioned matrices so as to obtain the transposed matrix of the computation matrix, and return the transposed matrix of the computation matrix to the data storage unit, where n is a natural number.

3. The computation device of claim 2, wherein the computation unit further includes a buffer unit for buffering the n partitioned matrices so that the matrix computation unit can acquire the n partitioned matrices.

4. The computation device of claim 3,
wherein the matrix computation control unit includes an instruction processing unit, an instruction buffer unit, and a matrix determination unit,
wherein the instruction buffer unit is configured to store matrix computational instructions to be executed,
wherein the instruction processing unit is configured to acquire matrix computational instructions from the instruction buffer unit, decode the matrix computational instructions, and acquire the address information of the computation matrix from the address storage unit according to the decoded matrix computational instructions, and
wherein the matrix determination unit is configured to analyze the address information of the computation matrix to obtain the partitioning information.

5. The computation device of claim 4,
wherein the matrix computation control unit further includes a dependency processing unit for determining whether the decoded matrix computational instructions and the address information of the computation matrix are conflict with a previous computation,
wherein if a conflict exists, the decoded matrix computational instructions and the address information of the computation matrix are temporarily stored, and
wherein if no conflict exists, the decoded matrix computational instructions and the address information of the computation matrix are sent to the matrix determination unit.

6. The computation device of claim 5,
wherein the matrix computation control unit further includes an instruction queue memory configured to buffer the decoded matrix computational instructions and the address information of computation matrix with conflict,
when the conflict is eliminated, the decoded matrix computational instructions and the address information of computation matrix that are buffered are sent to the matrix determination unit.

7. The computation device of claim 6,
wherein the instruction processing unit includes a fetching unit and a decoding unit,
wherein the fetching unit is configured to acquire the matrix computational instructions from the instruction buffer unit and transmit the matrix computational instructions to the decoding unit, and
wherein the decoding unit is configured to decode the matrix computational instructions, extract the address information of the computation matrix from the address storage unit according to the decoded matrix computational instructions, and transmit the decoded matrix computational instructions and the extracted address information of the computation matrix to the dependency processing unit.

8. The computation device of claim 1, wherein the device further includes an input/output unit configured to input the computation matrix data to the data storage unit and acquire the transposed matrix after computation from the data storage unit, and outputting the transposed matrix after computation.

9. The computation device of claim 1,
wherein the address storage unit includes a scalar register file or a universal memory unit,
wherein the data storage unit includes a cache or a universal memory unit, and
wherein the address information of the computation matrix is initial address information of the matrix and matrix size information.

10. A computation method, comprising:
determining partitioning information by a matrix computation control unit; and
subjecting, by a computation unit, a computation matrix to a partitioning computation, a transpose computation, and a merging computation according to the partitioning information, to obtain a transposed matrix of the computation matrix,
wherein the determining partitioning information by the matrix computation control unit includes: extracting address information of the computation matrix by the matrix computation control unit from an address storage unit, and obtaining the partitioning information according to the address information of the computation matrix by the matrix computation control unit, and
wherein the extracting address information of the computation matrix by the matrix computation control unit from the address storage unit includes: extracting computational instructions by a fetching unit and sending the computational instructions to a decoding unit decoding, by the decoding unit, the computational instructions, acquiring the address information of the computation matrix from the address storage unit according to the decoded computational instructions, and sending the decoded computational instructions and the address information of the computation matrix to a dependency processing unit analyzing, by the dependency processing unit, whether the decoded computational instructions have a dependency in term of data with previous instructions that have not been completed, if a dependency exists, the decoded computational instructions and the corresponding address information of the computation matrix need to wait in an instruction queue memory until their dependency in term of data with the previous instructions that have not been completed no longer exists.

11. The computation method of claim 10, wherein, the subjecting by the computation unit the computation matrix to the partitioning computation, the transpose computation, and the merging computation according to the partitioning information to obtain the transposed matrix of the computation matrix includes:
extracting, by the computation unit, the computation matrix from the data storage unit according to the address information of the computation matrix, and partitioning the computation matrix into n partitioned matrices according to the partitioning information,
performing, by the computation unit, the transpose computations on the n partitioned matrices respectively to obtain transposed matrices of the n partitioned matrices, and
merging, by the computation unit, the transposed matrices of the n partitioned matrices to obtain a transposed matrix of the computation matrix and feedback the transposed matrix of the computation matrix to the data storage unit,
wherein, n is a natural number.

12. The computation method of claim 11, wherein, the merging by the computation unit the transposed matrices of the n partitioned matrices to obtain the transposed matrix of the computation matrix and feedback the transposed matrix of the computation matrix to the data storage unit includes:
receiving, by a matrix merging unit, the transposed matrix of each partitioned matrix, performing a matrix merging operation on all the partitions when a count of the received transposed matrices for the partitioned matrices reaches a total count, to obtain the transposed matrix of the computation matrix, and feeding back the transposed matrix to a designated address of the data storage unit,
accessing, by an input/output unit, the data storage unit directly, and reading the transposed matrix of the computation matrix obtained by computation from the data storage unit.

* * * * *

UNITED STATES PATENT AND TRADEMARK OFFICE
CERTIFICATE OF CORRECTION

| | | |
|---|---|---|
| PATENT NO. | : 10,671,913 B2 | Page 1 of 1 |
| APPLICATION NO. | : 16/520615 | |
| DATED | : June 2, 2020 | |
| INVENTOR(S) | : Shaoli Liu et al. | |

It is certified that error appears in the above-identified patent and that said Letters Patent is hereby corrected as shown below:

On the Title Page

Under item (63) Related U.S. Patent Documents:
Delete:
"The filing date for Application Number 16/281,711, filed on Feb. 22, 2019"
Insert:
--The filing date for Application Number 16/283,711, filed on Feb. 22, 2019--

Signed and Sealed this
Fourteenth Day of March, 2023

Katherine Kelly Vidal
*Director of the United States Patent and Trademark Office*